(12) United States Patent
Mellet et al.

(10) Patent No.: US 8,795,128 B2
(45) Date of Patent: Aug. 5, 2014

(54) MULTI-SPEED TRANSMISSION

(71) Applicant: GM Global Technology Operations LLC, Detroit, MI (US)

(72) Inventors: Edward W. Mellet, Rochester Hills, MI (US); James M. Hart, Belleville, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 13/750,687

(22) Filed: Jan. 25, 2013

(65) Prior Publication Data

US 2013/0203550 A1 Aug. 8, 2013

Related U.S. Application Data

(60) Provisional application No. 61/594,612, filed on Feb. 3, 2012.

(51) Int. Cl.
*F16H 3/62* (2006.01)
*F16H 3/44* (2006.01)
*F16H 3/66* (2006.01)

(52) U.S. Cl.
CPC .......... *F16H 3/62* (2013.01); *F16H 2200/2012* (2013.01); *F16H 2200/0069* (2013.01); *F16H 2200/2048* (2013.01); *F16H 3/66* (2013.01)
USPC ............................ 475/276; 475/275; 475/296

(58) Field of Classification Search
CPC .................................................. F16H 2003/442
See application file for complete search history.

(56) References Cited

U.S. PATENT DOCUMENTS

| | | | |
|---|---|---|---|
| 6,991,578 B2 | 1/2006 | Ziemer | |
| 7,011,597 B2 | 3/2006 | Haka | |
| 7,018,319 B2 | 3/2006 | Ziemer | |
| 2004/0048716 A1* | 3/2004 | Ziemer | 475/286 |

* cited by examiner

*Primary Examiner* — Gene Crawford
*Assistant Examiner* — Mark Manley

(57) ABSTRACT

A transmission is provided having an input member, an output member, at least four planetary gear sets, a plurality of coupling members and a plurality of torque transmitting devices. Each of the planetary gear sets includes first, second and third members. The torque transmitting devices include three clutches and four brakes actuatable in combinations of three to establish a plurality of forward gear ratios and one reverse gear ratio.

17 Claims, 2 Drawing Sheets

| GEAR STATE | GEAR RATIO | RATIO STEP | TORQUE TRANSMITTING ELEMENTS ||||||| 
|---|---|---|---|---|---|---|---|---|---|
| | | | 32 | 30 | 34 | 36 | 24 | 26 | 28 |
| REV | -4.132 | | X | | | X | | | X |
| N | | -0.97 | | | | | | | |
| 1ST | 4.270 | | | | | X | | X | X |
| 2ND | 3.014 | 1.42 | | X | | X | | X | |
| 3RD | 2.312 | 1.30 | | X | | X | | | X |
| 4TH | 1.765 | 1.31 | | | | X | X | | X |
| 5TH | 1.349 | 1.31 | | X | | | X | | X |
| 6TH | 1.146 | 1.18 | | X | | | X | X | |
| 7TH | 1.000 | 1.15 | | | | | X | X | X |
| 8TH | 0.869 | 1.15 | | | X | | X | X | |
| 9TH | 0.766 | 1.13 | | | X | | X | | X |
| 10TH | 0.617 | 1.24 | X | | | | X | | X |

X = ON - ENGAGED CARRYING TORQUE
O = ON - ENGAGED NOT CARRYING TORQUE

FIG. 3

United States Patent US 8,795,128 B2

MULTI-SPEED TRANSMISSION

CROSS-REFERENCE TO RELATED APPLICATIONS

This application claims the benefit of U.S. Provisional Application No. 61/594,612 filed Feb. 3, 2012. The disclosure of the above application is incorporated herein by reference.

FIELD

The invention relates generally to a multiple speed transmission having a plurality of planetary gear sets and a plurality of torque transmitting devices and more particularly to a transmission having ten or more speeds, at least four planetary gear sets and a plurality of torque transmitting devices

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes.

In one example the transmission includes an input member, an output member, first, second, third and fourth planetary gear sets each having first, second and third members, wherein the input member and the output member are each continuously interconnected to at least one of the first, second, and third members of the first, second, third, and fourth planetary gear sets, a first interconnecting member continuously interconnecting the first member of the first planetary gear set with the first member of the second planetary gear set, a second interconnecting member continuously interconnecting the third member of the first planetary gear set with the second member of the second planetary gear set, a third interconnecting member continuously interconnecting the first member of the third planetary gear set with the first member of the fourth planetary gear set, and a fourth interconnecting member continuously interconnecting the third member of the third planetary gear set with the second member of the fourth planetary gear set. A first torque transmitting mechanism is selectively engageable to interconnect the second member of the first planetary gear set with the second member of the third planetary gear set. A second torque transmitting mechanism is selectively engageable to interconnect the third member of the first planetary gear set and the second member of the second planetary gear set with the first member of the third planetary gear set and the first member of the fourth planetary gear set. A third torque transmitting mechanism is selectively engageable to interconnect the third member of the second planetary gear set with the first member of the third planetary gear set and the first member of the fourth planetary gear set. A fourth torque transmitting mechanism is selectively engageable to interconnect the first member of the first planetary gear set and the first member of the second planetary gear set with the stationary member. A fifth torque transmitting mechanism is selectively engageable to interconnect the third member of the first planetary gear set and the second member of the second planetary gear set with the stationary member. A sixth torque transmitting mechanism is selectively engageable to interconnect the third member of the second planetary gear set with the stationary member. A seventh torque transmitting mechanism is selectively engageable to interconnect the third member of the fourth planetary gear set with the stationary member. The seven torque transmitting mechanisms are selectively engageable in combinations of at least three to establish at least ten forward speed ratios and at least one reverse speed ratio between the input member and the output member.

In another example of the transmission, the input member is continuously connected for common rotation with the second member of the first planetary gear set.

In yet another example of the transmission, the output member is continuously connected for common rotation with the third member of the third planetary gear set and the second member of the fourth planetary gear set.

In yet another example of the transmission, the first members are sun gear members, the second members are planet carrier members, and the third members are ring gear members.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting elements in each of the available forward and reverse speeds or gear ratios of the transmissions illustrated in FIGS. 1, 2 and 3.

DETAILED DESCRIPTION

The following description is merely exemplary in nature and is not intended to limit the present disclosure, application, or uses.

At the outset, it should be appreciated that the embodiments of the multi-speed automatic transmissions of the present invention have an arrangement of permanent mechanical connections between the elements of the four planetary gear sets. For example, a first component or element of a first planetary gear set is permanently coupled to a first component or element of the second planetary gear set. A third component or element of the first planetary gear set is permanently coupled a second component or element of the second planetary gear set. A first component or element of the third planetary gear set is permanently coupled to a first component or element of the fourth planetary gear set. A third component or element of the third planetary gear set is permanently coupled to a second component or element of the fourth planetary gear set.

Figure 1:
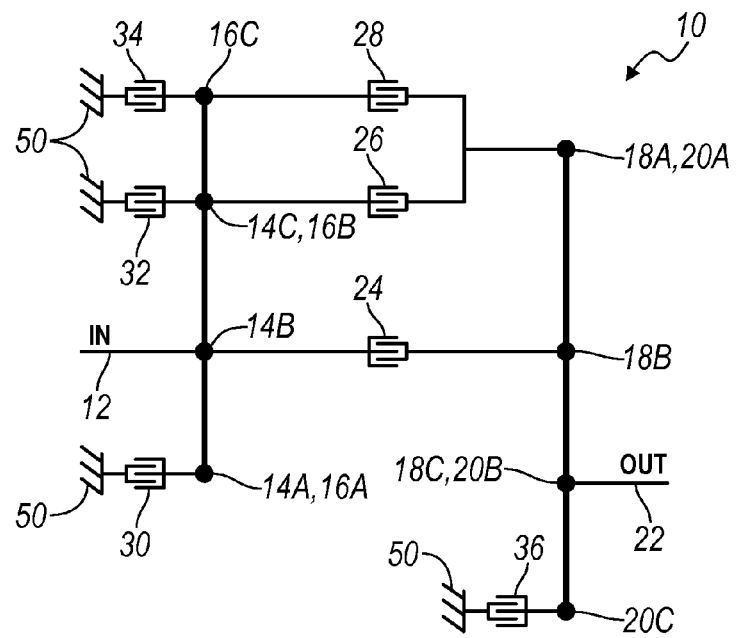
FIG. 1 is a lever diagram of an embodiment of a ten speed transmission according to the present invention.

Referring now to FIG. 1, an embodiment of a ten speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18 and a fourth planetary gear set 20 and an output shaft or member 22. In the lever diagram of FIG. 1, the levers for the first planetary gear set 14 and the second planetary gear set 16 have been combined into a single four node lever having: a first node 14A, 16A, a second node 14B, a third node 14C, 16B and a fourth node 16C. Thus, the first member 14A of the first planetary gear set 14 is coupled directly to the first member 16A of the second planetary gear set 16 and the third member 14C of the first planetary gear set 14 is coupled directly to the second member 16B of the second planetary gear set 16. The levers for the third planetary gear set 18 and the fourth planetary gear set 20 also have been combined into a single four node lever having: a first node 18A, 20A, a second node 18B, a third node 18C, 20B and a fourth node 20C.

The input member 12 is continuously coupled to the second node 14C of the combined levers of the first and second planetary gear sets 14, 16. The output member 22 is coupled to the third node 18C, 20B of the combined levers of the third and fourth planetary gear sets 18, 20.

A first clutch 24 selectively connects the second node 14B of the combined levers of the first and second planetary gear sets 14, 16 with the second node 18B of the combined levers of the third and fourth planetary gear sets 18, 20. A second clutch 26 selectively connects the third node 14C, 16B of the combined levers of the first and second planetary gear sets 14, 16 with the first node 18A, 20A of the combined levers of the third and fourth planetary gear sets 18, 20. A third clutch 28 selectively connects the fourth node 16C of the combined levers of the first and second planetary gear sets 14, 16 with the first node 18A, 20A of the combined levers of the third and fourth planetary gear sets 18, 20. A first brake 30 selectively connects first node 14A, 16A of the combined levers of the first and second planetary gear sets 14, 16 with a stationary member or transmission housing 50. A second brake 32 selectively connects the third node 14C, 16B of the combined levers of the first and second planetary gear sets 14, 16 with the stationary member or transmission housing 50. A third brake 34 selectively connects the fourth node 16C of the combined levers of the first and second planetary gear sets 14, 16 with the stationary member or transmission housing 50. A fourth brake 36 selectively connects the fourth node 20C of the combined levers of the third and fourth planetary gear sets 18, 20 with the stationary member or transmission housing 50.

Figure 2:
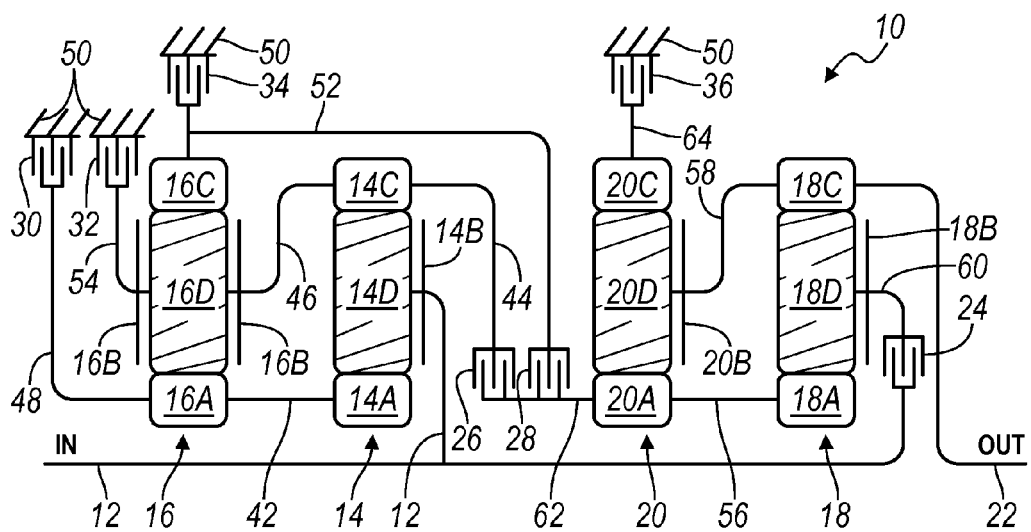
FIG. 2 is a diagrammatic illustration of an embodiment of a ten speed transmission according to the present invention.

Referring now to FIG. 2, a stick diagram presents a schematic layout of an embodiment of the ten speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14A, a ring gear member 14C and a planet gear carrier member 14B that rotatably supports a set of planet gears 14D (only one of which is shown). The sun gear member 14A is connected for common rotation with a first shaft or interconnecting member 42. The ring gear member 14C is connected for common rotation with a second shaft or interconnecting member 44 and a third shaft or interconnecting member 46. The planet carrier member 14B is connected for common rotation with the input shaft or member 12. The planet gears 14D are each configured to intermesh with both the sun gear member 14A and the ring gear member 14C.

The planetary gear set 16 includes a sun gear member 16A, a ring gear member 16C and a planet gear carrier member 16B that rotatably supports a set of planet gears 16D (only one of which is shown). The sun gear member 16A is connected for common rotation with the first shaft or interconnecting member 42 and a fourth shaft or interconnecting member 48. The ring gear member 16C is connected for common rotation with a fifth shaft or interconnecting member 52. The planet carrier member 16B is connected for common rotation with the third shaft or interconnecting member 46 and a sixth shaft or interconnecting member 54. The planet gears 16D are each configured to intermesh with both the sun gear member 16A and the ring gear member 16C.

The planetary gear set 18 includes a sun gear member 18A, a ring gear member 18C and a planet gear carrier member 18B that rotatably supports a set of planet gears 18D (only one of which is shown). The sun gear member 18A is connected for common rotation with a seventh shaft or interconnecting member 56. The ring gear member 18C is connected for common rotation with an eighth shaft or interconnecting member 58 and with the output shaft or member 22. The planet carrier member 18B is connected for common rotation with a ninth shaft or interconnecting member 60. The planet gears 18D are each configured to intermesh with both the sun gear member 18A and the ring gear member 18C.

The planetary gear set 20 includes a sun gear member 20A, a ring gear member 20C and a planet gear carrier member 20B that rotatably supports a set of planet gears 20D (only one of which is shown). The sun gear member 20A is connected for common rotation with the seventh shaft or interconnecting member 56 and with a tenth shaft or interconnecting member 62. The ring gear member 20C is connected for common rotation with an eleventh shaft or interconnecting member 64.

The planet carrier member 20B is connected for common rotation with the eighth shaft or interconnecting member 58. The planet gears 20D are each configured to intermesh with both the sun gear member 20A and the ring gear member 20C.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 24, 26, 28 and brakes 30, 32, 34 and 36 allow for selective interconnection of the shafts or interconnecting members, members of the planetary gear sets and the housing. For example, the first clutch 24 is selectively engageable to connect the input shaft or member 12 with the ninth shaft or interconnecting member 60. The second clutch 26 is selectively engageable to connect the second shaft or interconnecting member 44 with the tenth shaft or interconnecting member 62. The third clutch 28 is selectively engageable to connect the fifth shaft or interconnecting member 52 with the tenth shaft or interconnecting member 62. The first brake 30 is selectively engageable to connect the fourth shaft or interconnecting member 48 with the stationary element or the transmission housing 50 in order to restrict the member 48 from rotating relative to the transmission housing 50. The second brake 32 is selectively engageable to connect the sixth shaft or interconnecting member 54 with the stationary element or the transmission housing 50 in order to restrict the member 54 from rotating relative to the transmission housing 50. The third brake 34 is selectively engageable to connect the fifth shaft or interconnecting member 52 with the stationary element or the transmission housing 50 in order to restrict the member 52 from rotating relative to the transmission housing 50. The fourth brake 36 is selectively engageable to connect the eleventh shaft or interconnecting member 64 with the stationary element or the transmission housing 50 in order to restrict the member 64 from rotating relative to the transmission housing 50.

Referring now to FIG. 2 and FIG. 3, the operation of the ten speed transmission 10 will be described. It will be appreciated that transmission 10 is capable of transmitting torque from the input shaft or member 12 to the output shaft or member 22 in at least ten forward speed or torque ratios and at least one reverse speed or torque ratio. Each forward and reverse speed or torque ratio is attained by engagement of two or more of the torque-transmitting mechanisms (i.e. first clutch 24, second clutch 26, third clutch 28, first brake 30, second brake 32, third brake 34 and fourth brake 36), as will be explained below. FIG. 3 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

For example to establish a reverse gear, third clutch 28, second brake 32 and fourth brake 36 are engaged or activated. The third clutch 28 connects the fifth shaft or interconnecting member 52 with the tenth shaft or interconnecting member 62. The second brake 32 connects the sixth shaft or interconnecting member 54 with the stationary element or the transmission housing 50 in order to restrict the member 54 from rotating relative to the transmission housing 50. The fourth brake 36 connects the eleventh shaft or interconnecting member 64 with the stationary element or the transmission housing 50 in order to restrict the member 64 from rotating relative to the transmission housing 50. Likewise, the ten forward ratios are achieved through different combinations of clutch and brake engagement, as shown in FIG. 3.

It will be appreciated that the foregoing explanation of operation and gear states of the ten speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

The following is claimed:

1. A transmission comprising:
   an input member;
   an output member;
   first, second, third and fourth planetary gear sets each having first, second and third members, wherein the input member is continuously connected for common rotation with the second member of the first planetary gear set and the output member is continuously interconnected to at least one of the first, second, and third members of the first, second, third, and fourth planetary gear sets;
   a first interconnecting member continuously interconnecting the first member of the first planetary gear set with the first member of the second planetary gear set;
   a second interconnecting member continuously interconnecting the third member of the first planetary gear set with the second member of the second planetary gear set;
   a third interconnecting member continuously interconnecting the first member of the third planetary gear set with the first member of the fourth planetary gear set;
   a fourth interconnecting member continuously interconnecting the third member of the third planetary gear set with the second member of the fourth planetary gear set; and
   seven torque transmitting mechanisms each selectively engageable to interconnect at least one of the first, second, and third members with at least one other of the first, second, third members and the stationary member, and
   wherein the seven torque transmitting mechanisms are selectively engageable in combinations of at least three to establish at least ten forward speed ratios and at least one reverse speed ratio between the input member and the output member.

2. The transmission of claim 1 wherein a first of the seven torque transmitting mechanisms is selectively engageable to interconnect the second member of the first planetary gear set with the second member of the third planetary gear set.

3. The transmission of claim 1 wherein a second of the seven torque transmitting mechanisms is selectively engageable to interconnect the third member of the first planetary gear set and the second member of the second planetary gear set with the first member of the third planetary gear set and the first member of the fourth planetary gear set.

4. The transmission of claim 1 wherein a third of the seven torque transmitting mechanisms is selectively engageable to interconnect the third member of the second planetary gear set with the first member of the third planetary gear set and the first member of the fourth planetary gear set.

5. The transmission of claim 1 wherein a fourth of the seven torque transmitting mechanisms is selectively engageable to interconnect the first member of the first planetary gear set and the first member of the second planetary gear set with the stationary member.

6. The transmission of claim 1 wherein a fifth of the seven torque transmitting mechanisms is selectively engageable to interconnect the third member of the first planetary gear set and the second member of the second planetary gear set with the stationary member.

7. The transmission of claim 1 wherein a sixth of the seven torque transmitting mechanisms is selectively engageable to interconnect the third member of the second planetary gear set with the stationary member.

8. The transmission of claim 1 wherein a seventh of the seven torque transmitting mechanisms is selectively engageable to interconnect the third member of the fourth planetary gear set with the stationary member.

9. The transmission of claim 1 wherein the output member is continuously connected for common rotation with the third member of the third planetary gear set and the second member of the fourth planetary gear set.

10. The transmission of claim 1 wherein the first members are sun gear members, the second members are planet carrier members, and the third members are ring gear members.

11. A transmission comprising:
an input member;
an output member;
first, second, third and fourth planetary gear sets each having first, second and third members, wherein the input member and the output member are each continuously interconnected to at least one of the first, second, and third members of the first, second, third, and fourth planetary gear sets;
a first interconnecting member continuously interconnecting the first member of the first planetary gear set with the first member of the second planetary gear set;
a second interconnecting member continuously interconnecting the third member of the first planetary gear set with the second member of the second planetary gear set;
a third interconnecting member continuously interconnecting the first member of the third planetary gear set with the first member of the fourth planetary gear set;
a fourth interconnecting member continuously interconnecting the third member of the third planetary gear set with the second member of the fourth planetary gear set;
a first torque transmitting mechanism selectively engageable to directly interconnect the second member of the first planetary gear set with the second member of the third planetary gear set;
a second torque transmitting mechanism selectively engageable to interconnect the third member of the first planetary gear set and the second member of the second planetary gear set with the first member of the third planetary gear set and the first member of the fourth planetary gear set;
a third torque transmitting mechanism selectively engageable to interconnect the third member of the second planetary gear set with the first member of the third planetary gear set and the first member of the fourth planetary gear set;
a fourth torque transmitting mechanism selectively engageable to interconnect the first member of the first planetary gear set and the first member of the second planetary gear set with the stationary member;
a fifth torque transmitting mechanism selectively engageable to interconnect the third member of the first planetary gear set and the second member of the second planetary gear set with the stationary member;
a sixth torque transmitting mechanism selectively engageable to interconnect the third member of the second planetary gear set with the stationary member; and
a seventh torque transmitting mechanism selectively engageable to interconnect the third member of the fourth planetary gear set with the stationary member,
wherein the seven torque transmitting mechanisms are selectively engageable in combinations of at least three to establish at least ten forward speed ratios and at least one reverse speed ratio between the input member and the output member.

12. The transmission of claim 11 wherein the input member is continuously connected for common rotation with the second member of the first planetary gear set.

13. The transmission of claim 11 wherein the output member is continuously connected for common rotation with the third member of the third planetary gear set and the second member of the fourth planetary gear set.

14. The transmission of claim 11 wherein the first members are sun gear members, the second members are planet carrier members, and the third members are ring gear members.

15. A transmission comprising:
an input member;
an output member;
first, second, third and fourth planetary gear sets each having a sun gear, a carrier member, and a ring gear, wherein the input member and the output member are each continuously interconnected to at least one of the sun gear, carrier member, and ring gear of the first, second, third, and fourth planetary gear sets;
a first interconnecting member continuously interconnecting the sun gear of the first planetary gear set with the sun gear of the second planetary gear set;
a second interconnecting member continuously interconnecting the ring gear of the first planetary gear set with the carrier member of the second planetary gear set;
a third interconnecting member continuously interconnecting the sun gear of the third planetary gear set with the sun gear of the fourth planetary gear set;
a fourth interconnecting member continuously interconnecting the ring gear of the third planetary gear set with the carrier member of the fourth planetary gear set;
a first torque transmitting mechanism selectively engageable to interconnect the carrier member of the first planetary gear set with the carrier member of the third planetary gear set;
a second torque transmitting mechanism selectively engageable to interconnect the ring gear of the first planetary gear set and the carrier member of the second planetary gear set with the sun gear of the third planetary gear set and the sun gear of the fourth planetary gear set;
a third torque transmitting mechanism selectively engageable to interconnect the ring gear of the second planetary gear set with the sun gear of the third planetary gear set and the sun gear of the fourth planetary gear set;
a fourth torque transmitting mechanism selectively engageable to interconnect the sun gear of the first planetary gear set and the sun gear of the second planetary gear set with the stationary member;

a fifth torque transmitting mechanism selectively engageable to interconnect the ring gear of the first planetary gear set and the carrier member of the second planetary gear set with the stationary member;

a sixth torque transmitting mechanism selectively engageable to interconnect the ring gear of the second planetary gear set with the stationary member; and a seventh torque transmitting mechanism selectively engageable to interconnect the ring gear of the fourth planetary gear set with the stationary member, wherein the seven torque transmitting mechanisms are selectively engageable in combinations of at least three to establish at least ten forward speed ratios and at least one reverse speed ratio between the input member and the output member.

16. The transmission of claim 15 wherein the input member is continuously connected for common rotation with the carrier member of the first planetary gear set.

17. The transmission of claim 15 wherein the output member is continuously connected for common rotation with the ring gear of the third planetary gear set and the carrier member of the fourth planetary gear set.

* * * * *